(12) United States Patent
Sugai et al.

(10) Patent No.: US 11,524,684 B2
(45) Date of Patent: Dec. 13, 2022

(54) VEHICLE CONTROL DEVICE FOR AN ADAPTIVE VARIABLE SUSPENSION

(71) Applicant: AISIN CORPORATION, Aichi (JP)

(72) Inventors: Masaya Sugai, Kariya (JP); Satoshi Kokubo, Kariya (JP); Shinya Harada, Kariya (JP)

(73) Assignee: AISIN CORPORATION, Kariya (JP)

( * ) Notice: Subject to any disclaimer, the term of this patent is extended or adjusted under 35 U.S.C. 154(b) by 272 days.

(21) Appl. No.: 16/861,297

(22) Filed: Apr. 29, 2020

(65) Prior Publication Data
US 2020/0369277 A1 Nov. 26, 2020

(30) Foreign Application Priority Data
May 21, 2019 (JP) .............................. JP2019-095301

(51) Int. Cl.
| | |
|---|---|
| *B60W 30/18* | (2012.01) |
| *B60G 17/016* | (2006.01) |
| *B60K 7/00* | (2006.01) |
| *B60W 10/22* | (2006.01) |
| *B60W 10/08* | (2006.01) |
| *B60W 10/184* | (2012.01) |

(52) U.S. Cl.
CPC ... *B60W 30/18009* (2013.01); *B60G 17/0164* (2013.01); *B60K 7/0007* (2013.01); *B60W 10/08* (2013.01); *B60W 10/184* (2013.01); *B60W 10/22* (2013.01); *B60G 2400/10* (2013.01); *B60W 2510/22* (2013.01); *B60W 2520/105* (2013.01); *B60W 2530/00* (2013.01); *B60W 2710/083* (2013.01); *B60W 2710/18* (2013.01); *B60W 2710/226* (2013.01); *B60W 2720/106* (2013.01)

(58) Field of Classification Search
CPC .................................................. B60G 17/0164
See application file for complete search history.

(56) References Cited

U.S. PATENT DOCUMENTS

| | | | |
|---|---|---|---|
| 6,058,340 A | 5/2000 | Uchiyama et al. | |
| 8,285,447 B2 * | 10/2012 | Bennett ................ | B60G 17/019 280/5.518 |
| 10,603,972 B2 * | 3/2020 | Unger ................... | B60W 10/18 |
| 2012/0247888 A1 | 10/2012 | Chikuma et al. | |
| 2019/0283733 A1 * | 9/2019 | Takei .................... | B60W 10/04 |

FOREIGN PATENT DOCUMENTS

| | | |
|---|---|---|
| JP | 7-232530 A | 9/1995 |
| JP | 2012-206685 A | 10/2012 |

\* cited by examiner

*Primary Examiner* — Todd Melton
(74) *Attorney, Agent, or Firm* — Oblon, McClelland, Maier & Neustadt, L.L.P.

(57) ABSTRACT

A vehicle control device includes: a control portion that makes, of a plurality of shock absorbers included in a vehicle, a first damping force of at least one shock absorber that is located on a first direction side on which acceleration acts in a longitudinal direction of the vehicle larger than a second damping force of at least one shock absorber of the plurality of shock absorbers that is located on a second direction side opposite to the first direction in the longitudinal direction of the vehicle before acceleration acting on the vehicle is detected by an acceleration sensor due to acceleration or deceleration of the vehicle.

7 Claims, 8 Drawing Sheets

VEHICLE CONTROL DEVICE FOR AN ADAPTIVE VARIABLE SUSPENSION

CROSS REFERENCE TO RELATED APPLICATIONS

This application is based on and claims priority under 35 U.S.C. § 119 to Japanese Patent Application 2019-095301, filed on May 21, 2019, the entire contents of which are incorporated herein by reference.

TECHNICAL FIELD

Embodiments of this disclosure relates to a vehicle control device.

BACKGROUND DISCUSSION

A technique has been developed, in which an acceleration detection result is obtained from an acceleration sensor that detects the acceleration acting in a vertical direction of a vehicle, an absolute speed of the vertical movement of the vehicle is obtained based on the detection result of the acceleration, and a damping force of the suspension is changed according to the absolute speed to suppress the vertical vibration of the vehicle.

JP 07-232530A is an example of the related art.

However, in the technique of changing the damping force of the suspension based on the detection result of the acceleration by the acceleration sensor, the damping force of the suspension cannot be changed unless the driving source for driving the wheels of the vehicle outputs torque and the posture of the vehicle changes according to the instruction of acceleration or deceleration by the driver of the vehicle and the stroke amount of the suspension or the acceleration in the vertical direction of the vehicle changes. Therefore, the responsiveness of the control of the damping force of the suspension is reduced, and it may be difficult to suppress a nose dive or the like due to the deceleration of the vehicle.

Thus, a need exists for a vehicle control device which is not susceptible to the drawback mentioned above.

SUMMARY

A vehicle control device according to an aspect of this disclosure includes, for example, a control portion that makes, of a plurality of shock absorbers included in a vehicle, a first damping force of at least one shock absorber that is located on a first direction side on which acceleration acts in a longitudinal direction of the vehicle larger than a second damping force of at least one shock absorber of the plurality of shock absorbers that is located on a second direction side opposite to the first direction in the longitudinal direction of the vehicle before acceleration acting on the vehicle is detected by an acceleration sensor due to acceleration or deceleration of the vehicle. Therefore, as an example, the riding comfort of the vehicle when the vehicle accelerates or decelerates can be improved.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments of this disclosure will be disclosed. The configurations of the embodiments described below, and the actions, results, and effects provided by the configurations are examples. This disclosure can be realized by a configuration other than the configurations disclosed in the following embodiments, and can obtain at least one of various effects based on the basic configuration and derivative effects.

First Embodiment

First, an example of a hardware configuration of a vehicle to which the vehicle control device according to the present embodiment is applied will be described with reference to FIG. 1.

Figure 1:
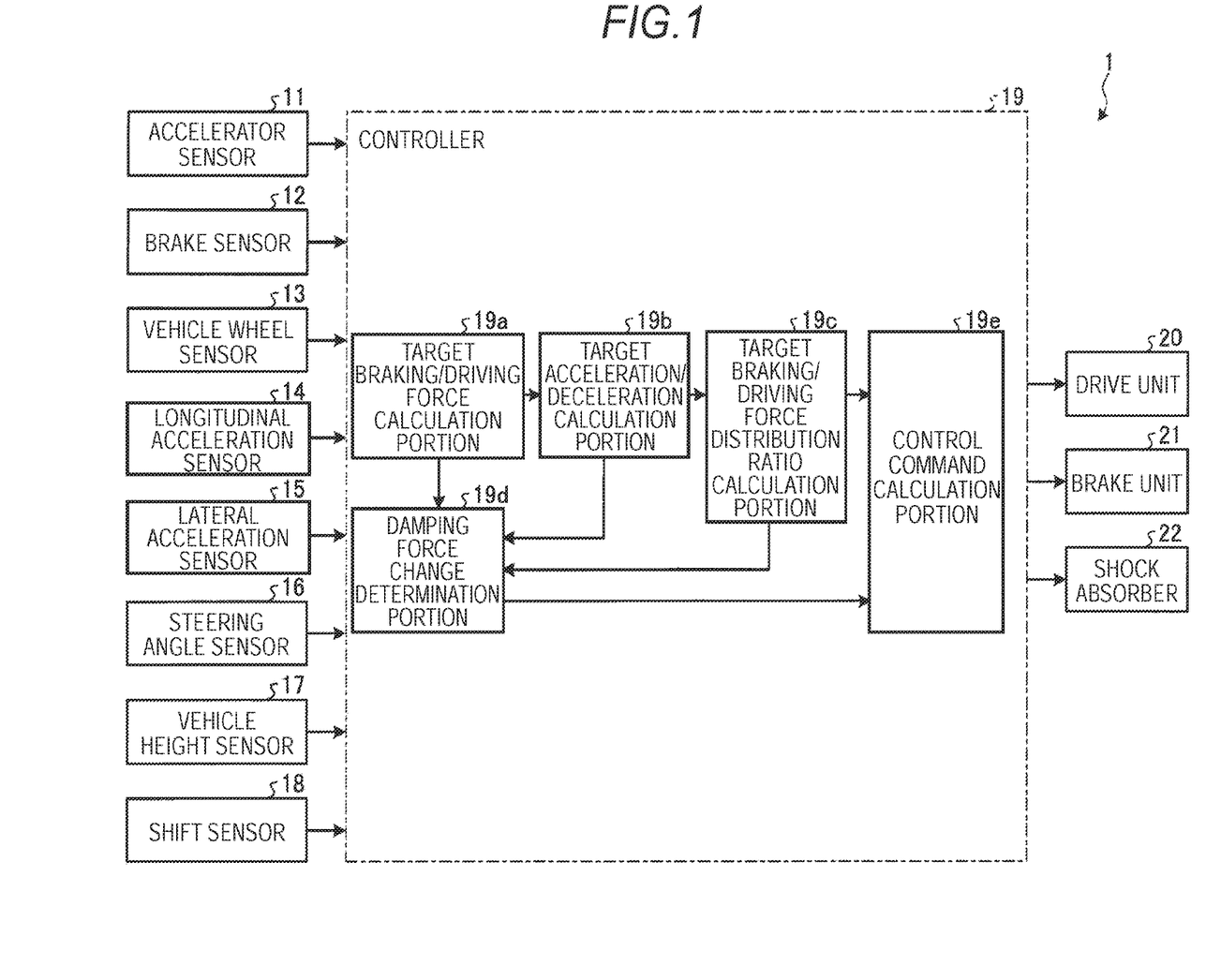
FIG. 1 is a block diagram illustrating an example of a hardware configuration of a vehicle to which a vehicle control device according to a first embodiment is applied.

FIG. 1 is a block diagram illustrating an example of a hardware configuration of a vehicle to which a vehicle control device according to a first embodiment is applied. As illustrated in FIG. 1, a vehicle 1 according to the present embodiment includes an accelerator sensor 11, a brake sensor 12, a vehicle wheel sensor 13, a longitudinal acceleration sensor 14, a lateral acceleration sensor 15, a steering angle sensor 16, a vehicle height sensor 17, a shift sensor 18, a controller 19, a plurality of drive units 20, a plurality of brake units 21, and a plurality of shock absorbers 22.

The accelerator sensor 11 includes a displacement sensor and the like, and is a sensor for detecting a position of a movable portion (for example, an accelerator pedal) of an accelerating operation portion.

The brake sensor 12 includes a displacement sensor and the like, and detects the position of a movable portion (for example, a brake pedal) of a braking operation portion.

The vehicle wheel sensor 13 includes a Hall element and the like, and is a sensor for detecting a rotation amount of each wheel of the vehicle 1. The vehicle 1 may have a vehicle speed sensor that detects the speed (vehicle speed) of the vehicle 1 instead of the vehicle wheel sensor 13 or in addition to the wheel speed sensor 13.

The longitudinal acceleration sensor 14 is an acceleration sensor for detecting acceleration acting on the vehicle 1 in a longitudinal direction.

The lateral acceleration sensor 15 is an acceleration sensor for detecting acceleration acting on the vehicle 1 in a width direction (lateral direction).

The steering angle sensor 16 includes a Hall element and the like, and is a sensor for detecting a steering amount of a steering portion such as a steering wheel (for example, a rotation angle of a rotating portion of the steering portion).

The vehicle height sensor 17 is a sensor for detecting the vehicle height of the vehicle 1. The vehicle 1 may have a vertical acceleration sensor that detects acceleration acting in the vertical direction of the vehicle 1 instead of the vehicle height sensor 17 or in addition to the vehicle height sensor 17.

The shift sensor 18 is a sensor for detecting a position (for example, a parking range) of a movable portion (for example, a lever, an arm, a button) of a gear shift operating portion of the vehicle 1.

The drive unit 20 is a motor (for example, an electric motor) that applies a torque to the wheels of the vehicle 1. In the present embodiment, the vehicle 1 has, for each wheel, the drive unit 20 that applies torque (driving torque or braking torque) to the wheel. Specifically, when accelerating the vehicle 1, the drive unit 20 applies a driving torque to the wheel. On the other hand, when decelerating the vehicle 1, the drive unit 20 functions as a regenerative brake that applies a braking torque to the wheel.

In the present embodiment, the vehicle 1 has the drive unit 20 (for example, an in-wheel motor) for each wheel, but this disclosure is not limited to this, and the torque may be applied to a plurality of wheels from one drive unit 20 via a differential gear.

The brake unit 21 is a brake (for example, a hydraulic brake) that applies a braking torque (braking force) to the vehicle 1. In the present embodiment, the vehicle 1 has, for each wheel, the brake unit 21 that applies a braking torque to the wheel.

The shock absorber 22 is a suspension or the like, and is disposed between the vehicle body and the wheel of the vehicle 1. The shock absorber 22 includes a spring that absorbs vibration of the vehicle 1 due to an impact on the vehicle 1 from a road surface and a damping force variable damper capable of damping the vibration of the spring and changing the damping force of the vibration of the spring.

In the present embodiment, the shock absorber 22 controls a damping force adjusting unit such as a solenoid actuator in cooperation with the controller 19 described later to change the damping force of the damping force variable damper. Accordingly, the shock absorber 22 realizes an adaptive variable suspension system (AVS) that attenuates vibrations of the vehicle body in the vertical direction, the lateral direction, and the longitudinal direction due to an impact on the vehicle 1 from a road surface.

The controller 19 is an example of a vehicle control device that controls the entire vehicle 1. In the present embodiment, the controller 19 includes a target braking/driving force calculation portion 19a, a target acceleration/deceleration calculation portion 19b, a target braking/driving force distribution ratio calculation portion 19c, a damping force change determination portion 19d, and a control command calculation portion 19e.

The target braking/driving force calculation portion 19a obtains a detection result of the position of the movable portion of the accelerating operation portion by the accelerator sensor 11, a detection result of the position of the movable portion of the braking operation portion by the brake sensor 12, a detection result of the position of the movable portion of the gear shift operating portion by the shift sensor 23, a detection result of the steering amount by the steering angle sensor 16, a detection result of wheel rotation amount by the vehicle wheel sensor 13, and the like.

Next, the target braking/driving force calculation portion 19a calculates a target braking/driving torque which is a torque (driving torque or braking torque) applied to the wheels of the vehicle 1 based on the obtained various detection results. In the present embodiment, when it is determined that the vehicle 1 accelerates based on various detection results, the target braking/driving force calculation portion 19a calculates the driving torque (driving force) applied to the wheels of the vehicle 1 by the drive unit 20 as the target braking/driving torque. On the other hand, when it is determined that the vehicle 1 decelerates based on various detection results, the target braking/driving force calculation portion 19a calculates the braking torque (braking force) applied to the wheels of the vehicle 1 by at least one of the drive unit 20 and the brake unit 21 as the target braking/driving torque.

The target braking/driving force calculation portion 19a determines whether or not the indicator of the inclination of the vehicle 1 in the vertical direction (for example, an anti-dive amount that is an indicator of a nose dive of the vehicle 1 and an anti-squat amount that is an indicator of a squat of the vehicle 1) due to acceleration, deceleration, or turning of the vehicle 1 is smaller than a preset indicator based on the obtained various detection results.

The target acceleration/deceleration calculation portion 19b calculates the acceleration (or deceleration) acting on the vehicle 1 as a target acceleration/deceleration based on the target braking/driving torque calculated by the target braking/driving force calculation portion 19a.

The target braking/driving force distribution ratio calculation portion 19c calculates a ratio of the target braking/driving torque to be distributed to at least one of the plurality of drive units 20 and the plurality of brake units 21 (hereinafter, referred to as target braking/driving force distribution ratio) based on the target braking/driving torque calculated by the target braking/driving force calculation portion 19a and the target acceleration/deceleration calculated by the target acceleration/deceleration calculation portion 19b.

The damping force change determination portion 19d calculates the required damping force based on various detection results, the target braking/driving torque calculated by the target braking/driving force calculation portion 19a, the target acceleration/deceleration calculated by the target acceleration/deceleration calculation portion 19b, and the like. Here, the required damping force is a damping force of the damping force variable damper of the shock absorber 22 (hereinafter, referred to as a damping force of the shock absorber 22), and is a damping force capable of suppressing a change in the posture of the vehicle 1.

Specifically, the damping force change determination portion 19d calculates the damping force of each of the plurality of shock absorbers 22 so that the difference in the stroke amount of each of the plurality of shock absorbers 22 is reduced. Accordingly, when the vehicle 1 makes vertical movement due to acceleration, deceleration, or turning of the vehicle 1, the difference in the stroke amount of the plurality of shock absorbers 22 can be reduced. As a result, a change in the posture of the vehicle 1 is suppressed, and the riding comfort of the vehicle 1 can be improved.

For example, when the vehicle 1 accelerates or decelerates, the damping force change determination portion 19d makes the damping force of the shock absorber 22 of the plurality of shock absorbers 22 that is located on a direction side where the acceleration acts on the vehicle 1 (hereinafter referred to as acceleration direction) in the longitudinal direction of the vehicle 1 larger than the damping force of the shock absorber 22 of the plurality of shock absorbers 22 that is located on a direction side opposite to the acceleration direction (hereinafter referred to as non-acceleration direction) in the longitudinal direction of the vehicle 1. The acceleration direction is the rear direction of the vehicle 1 when the vehicle 1 accelerates, and the front direction of the vehicle 1 when the vehicle 1 decelerates.

Accordingly, the anti-squat control function for suppressing squat when the vehicle 1 accelerates and the anti-dive control function for suppressing nose dive when the vehicle 1 decelerates are improved, and a change in the posture of the vehicle 1 when the vehicle 1 suddenly starts and suddenly decelerates can be suppressed. As a result, the riding comfort of the vehicle 1 when the vehicle 1 accelerates or decelerates can be improved.

Also, for example, when the vehicle 1 turns, the damping force change determination portion 19d makes the damping force of the shock absorber 22 of the plurality of shock absorbers 22 that is located on the acceleration direction side in the lateral direction (vehicle width direction) of the vehicle 1 larger than the damping force of the shock absorber 22 of the plurality of shock absorbers 22 existing on the non-acceleration direction side in the vehicle width direction.

Accordingly, when the vehicle 1 turns, a change in the posture of the vehicle 1 in the roll direction can be suppressed. As a result, the riding comfort of the vehicle 1 when the vehicle 1 turns can be improved.

In the present embodiment, the damping force change determination portion 19d calculates the required damping force only when the target braking/driving force calculation portion 19a determines that the indicator of the inclination of the vehicle 1 in the vertical direction is equal to or larger than the preset indicator, but this disclosure is not limited to this.

For example, the damping force change determination portion 19d may calculate the required damping force irrespective of whether or not the indicator of the inclination of the vehicle 1 in the vertical direction is equal to or larger than a preset indicator when the accelerator sensor 11 detects a change in the position of the movable portion of the accelerating operation portion, when the brake sensor 12 detects a change in the position of the movable portion of the braking operation portion, or when the steering angle sensor 16 detects a change in the steering amount.

In this embodiment, the damping force change determination portion 19d calculates the required damping force according to the detection of the change in the position of the movable portion of the accelerating operation portion by the accelerator sensor 11, the detection of the change in the position of the movable portion of the braking operation portion by the brake sensor 12, or the detection of the change in the steering amount by the steering angle sensor 16, but this disclosure is not limited to this.

For example, when the vehicle 1 performs automatic driving, the damping force change determination portion 19d may calculate the required damping force according to information generated due to acceleration, deceleration, or turning of the vehicle 1 (for example, a current flowing through the drive unit 20 or a hydraulic pressure generated by the brake unit 21) without using various detection results by the accelerator sensor 11, the brake sensor 12, the steering angle sensor 16, and the like. Accordingly, even when the vehicle 1 performs automatic driving, the difference in the stroke amount of the plurality of shock absorbers 22 can be reduced when the vehicle 1 makes vertical movement due to acceleration, deceleration, or turning of the vehicle 1. As a result, a change in the posture of the vehicle 1 is suppressed, and the riding comfort of the vehicle 1 can be improved.

The control command calculation portion 19e controls the torque applied to the wheel by at least one of the drive unit 20 and the brake unit 21 according to the target braking/driving torque calculated by the target braking/driving force calculation portion 19a. At this time, the control command calculation portion 19e controls the torque applied to the wheel by the drive unit 20 or brake unit 21 for each drive unit 20 or brake unit 21 based on the target braking/driving force distribution ratio calculated by the target braking/driving force distribution ratio calculation portion 19c.

The control command calculation portion 19e changes the damping force of each of the plurality of shock absorbers 22 based on the damping force calculated by the damping force change determination portion 19d. At this time, the control command calculation portion 19e changes the damping force of the shock absorber 22 so that the difference in the stroke amount of the plurality of shock absorbers 22 is reduced before the acceleration acting on the vehicle 1 is detected by the longitudinal acceleration sensor 14 or the lateral acceleration sensor 15 due to acceleration, deceleration, or turning of the vehicle 1 according to the control signal.

Accordingly, when the vehicle 1 makes vertical movement due to acceleration, deceleration, or turning of the vehicle 1, the difference in the stroke amount of the plurality of shock absorbers 22 can be reduced, and the change in the posture of the vehicle 1 can be suppressed. As a result, the riding comfort of the vehicle 1 when the vehicle 1 accelerates, decelerates, or turns can be improved. Therefore, in the present embodiment, the damping force change determination portion 19d and the control command calculation portion 19e function as an example of a control portion that changes the damping force of the shock absorber 22 so that the difference in the stroke amount of the plurality of shock absorbers 22 is reduced.

Specifically, the control command calculation portion 19e controls the damping force adjusting unit of the shock absorber 22 before the acceleration acting on the vehicle 1 is detected by the acceleration sensor (for example, the longitudinal acceleration sensor 14) due to acceleration or deceleration of the vehicle 1 so that the damping force of the shock absorber 22 located on the acceleration direction side in the longitudinal direction of the vehicle 1 is made larger than the damping force of the shock absorber 22 located on the non-acceleration direction side in the longitudinal direction of the vehicle 1.

Accordingly, the anti-squat control function for suppressing squat when the vehicle 1 accelerates and the anti-dive control function for suppressing nose dive when the vehicle 1 decelerates are improved, and a change in the posture of the vehicle 1 can be suppressed. As a result, the riding comfort of the vehicle 1 when the vehicle 1 suddenly starts and suddenly decelerates can be improved.

More specifically, the control command calculation portion 19e controls the damping force adjusting unit of the shock absorber 22 before the acceleration acting on the vehicle 1 is detected by the acceleration sensor (for example, the lateral acceleration sensor 15) due to turning of the vehicle 1 so that the damping force of the shock absorber 22 located on the acceleration direction side in the vehicle width direction is made larger than the damping force of the shock absorber 22 located on the non-acceleration direction side in the vehicle width direction.

Accordingly, when the vehicle 1 turns, a change in the stroke amount of the shock absorber 22 existing on the non-acceleration direction side can be suppressed. As a result, the riding comfort of the vehicle 1 when the vehicle 1 turns can be improved.

In the present embodiment, the drive unit 20, the brake unit 21, and the shock absorber 22 are controlled by one control command calculation portion 19e, but this disclosure is not limited to this. The drive unit 20, the brake unit 21, and the shock absorber 22 may be controlled by a plurality of control portions.

Specifically, the drive unit 20, the brake unit 21, and the shock absorber 22 may be controlled by a control portion separately provided for the drive unit 20, the brake unit 21, and the shock absorber 22. Alternatively, a control device for controlling the drive unit 20, the brake unit 21, and the shock absorber 22 may be partially integrated. For example, the drive unit 20 and the brake unit 21 are controlled by one control portion, and the shock absorber 22 is controlled by a control portion different from the control portion of the drive unit 20 and the brake unit 21.

When the drive unit 20, the brake unit 21, and the shock absorber 22 are controlled by a plurality of control portions, the plurality of control portions transmit and receive various information used for controlling the control the drive unit 20, the brake unit 21, and the shock absorber 22 to and from each other via communication means.

Figure 2:
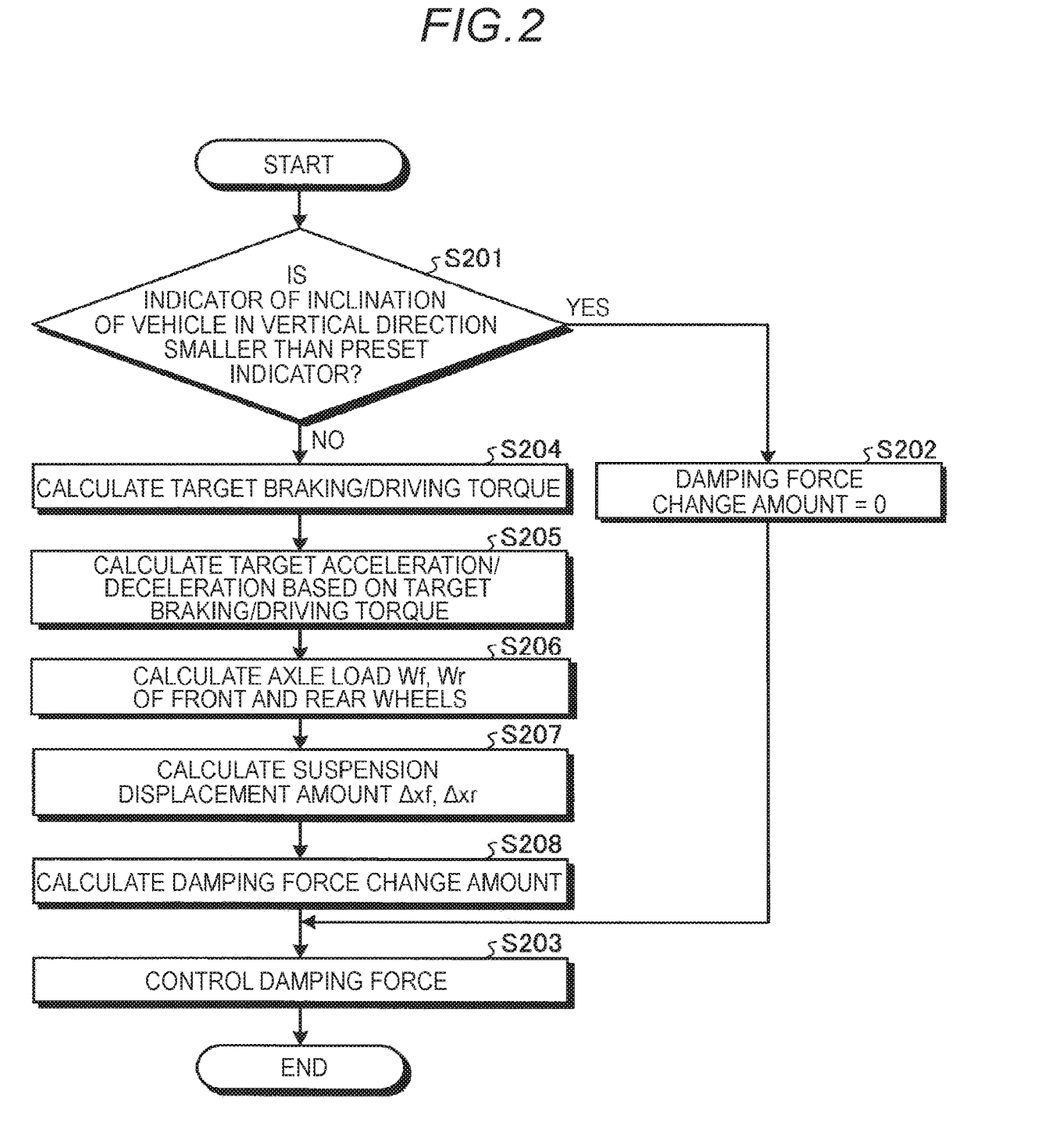
FIG. 2 is a flowchart illustrating an example of a flow of a process of changing a damping force of a shock absorber in the vehicle according to the first embodiment.

Next, an example of a flow of a process of changing the damping force of the shock absorber 22 during acceleration or deceleration of the vehicle 1 according to the present embodiment will be described with reference to FIG. 2. FIG. 2 is a flowchart illustrating an example of a flow of a process of changing a damping force of a shock absorber in the vehicle according to the first embodiment.

First, at a preset cycle, the target braking/driving force calculation portion 19a obtains various detection results such as a detection result of the position of the movable portion of the accelerating operation portion by the accelerator sensor 11, a detection result of the position of the movable portion of the braking operation portion by the brake sensor 12, a detection result of the position of the movable portion of the gear shift operating portion by the shift sensor 23, a detection result of the steering amount by the steering angle sensor 16, and a detection result of wheel rotation amount by the vehicle wheel sensor 13.

Next, the target braking/driving force calculation portion 19a determines whether or not an indicator of the inclination of the vehicle 1 in the vertical direction (for example, anti-dive amount or anti-squat amount) due to acceleration or deceleration of the vehicle 1 is smaller than the preset indicator based on the obtained various detection results (step S201).

When it is determined that the indicator of the inclination of the vehicle 1 in the vertical direction is smaller than the preset indicator (step S201: Yes), the damping force change determination portion 19d calculates "0" as a change amount of the damping force of the shock absorber 22 (hereinafter, referred to as a damping force change amount) (step S202). Then, when the damping force change amount calculated by the damping force change determination portion 19d is "0", the control command calculation portion 19e does not change the damping force of each of the plurality of shock absorbers 22 (step S203).

On the other hand, when it is determined that the indicator of the inclination of the vehicle 1 in the vertical direction is equal to or larger than the preset indicator (step S201: No), the target braking/driving force calculation portion 19a calculates the target braking/driving torque based on various detection results (step S204).

The target acceleration/deceleration calculation portion 19b calculates the target acceleration/deceleration based on the target braking/driving torque calculated by the target braking/driving force calculation portion 19a (step S205).

The damping force change determination portion 19d calculates the axle load Wf of the front wheels of the vehicle 1 and the axle load Wr of the rear wheels of the vehicle 1 based on the target acceleration/deceleration calculated by the target acceleration/deceleration calculation portion 19b (step S206).

In the present embodiment, the damping force change determination portion 19d calculates the axle load Wf of the front wheel of the vehicle 1 and the axle load Wr of the rear wheel of the vehicle 1 using the following equations (1) and (2).

$$Wf=(W\times(Lr/L))-(W\times a\times(H/g/L)) \quad (1)$$

$$Wr=(W\times(Lf/L))+(W\times a\times(H/g/L)) \quad (2)$$

In the above equations (1) and (2), W is the load at the center of gravity of the vehicle 1, L is the wheelbase of the vehicle 1, Lf is the distance from the center of gravity of the vehicle 1 to the center of the front wheel, Lr is the distance from the center of gravity of the vehicle 1 to the center of the rear wheel, H is the height of the center of gravity of the vehicle 1, g is the gravitational acceleration, and a is the target acceleration/deceleration.

Next, based on the axle load Wf of the front wheel of the vehicle 1 and the axle load Wr of the rear wheel of the vehicle 1, the damping force change determination portion 19d calculates a displacement amount of the stroke amount (hereinafter, referred to as a suspension displacement amount) Δxf of the front wheel shock absorber 22 of the vehicle 1 and a suspension displacement amount Δxr of the rear wheel shock absorber 22 of the vehicle 1 (step S207).

In the present embodiment, the damping force change determination portion 19d calculates the suspension displacement amount Δxf of the front wheel shock absorber 22 of the vehicle 1 and the suspension displacement Δxr of the rear wheel shock absorber 22 of the vehicle 1 using the following equations (3) and (4).

$$\Delta xf=Wf/Kf \quad (3)$$

$$\Delta xr=Wr/Kr \quad (4)$$

In the above equations (3) and (4). Kf is the spring constant (suspension rigidity) of the spring of the front wheel shock absorber 22 of the vehicle 1, and Kr is the spring constant (suspension rigidity) of the spring of the rear wheel shock absorber 22 of the vehicle 1.

Next, based on the suspension displacement amounts Δxf and Δxr of the shock absorbers 22 of the front and rear wheels of the vehicle 1, the damping force change determination portion 19d calculates the damping force change amount of each shock absorber 22 so that the difference in the stroke amounts of the shock absorbers 22 of the front and rear wheels of the vehicle 1 is reduced (step S208).

In the present embodiment, the controller 19 has a storage portion for storing a damping force change amount map. Here, the damping force change amount map is a map (table) that associates the suspension displacement amounts Δxf and Δxr with the damping force change amounts of the shock absorbers 22 of the front and rear wheels of the vehicle 1. In the present embodiment, the damping force change amount map may be a map that associates the suspension displacement amounts Δxf and Δxr with the damping force change amount that differs for each vehicle speed of the vehicle 1.

In the damping force change amount map, the damping force change determination portion 19*d* calculates the damping force change amount associated with suspension displacement amounts Δxf and Δxr of the shock absorbers 22 of the front and rear wheels of the vehicle 1 as the damping force change amount of each shock absorber 22. Since the damping force change amount can be uniquely obtained using the target braking/driving torque, the map used for calculating the damping force change amount can be reduced.

Next, the damping force change determination portion 19*d* calculates the total of the damping force change amount of each shock absorber 22 and the damping force change amount already applied to each shock absorber 22 (hereinafter, referred to as damping force before change) as the required damping force.

The control command calculation portion 19*e* Increases the damping force of each shock absorber 22 by the damping force change amount calculated for each shock absorber 22 (step S203). That is, the control command calculation portion 19*e* reflects the required damping force calculated for each shock absorber 22 on the damping force of the shock absorber 22.

Accordingly, before the acceleration is detected by the longitudinal acceleration sensor 14 due to the acceleration or deceleration of the vehicle 1, the damping force of each shock absorber 22 can be changed, and the difference in the stroke amount of the plurality of shock absorbers 22 can be suppressed. As a result, the riding comfort of the vehicle 1 when the vehicle 1 accelerates or decelerates can be improved.

Figure 3:
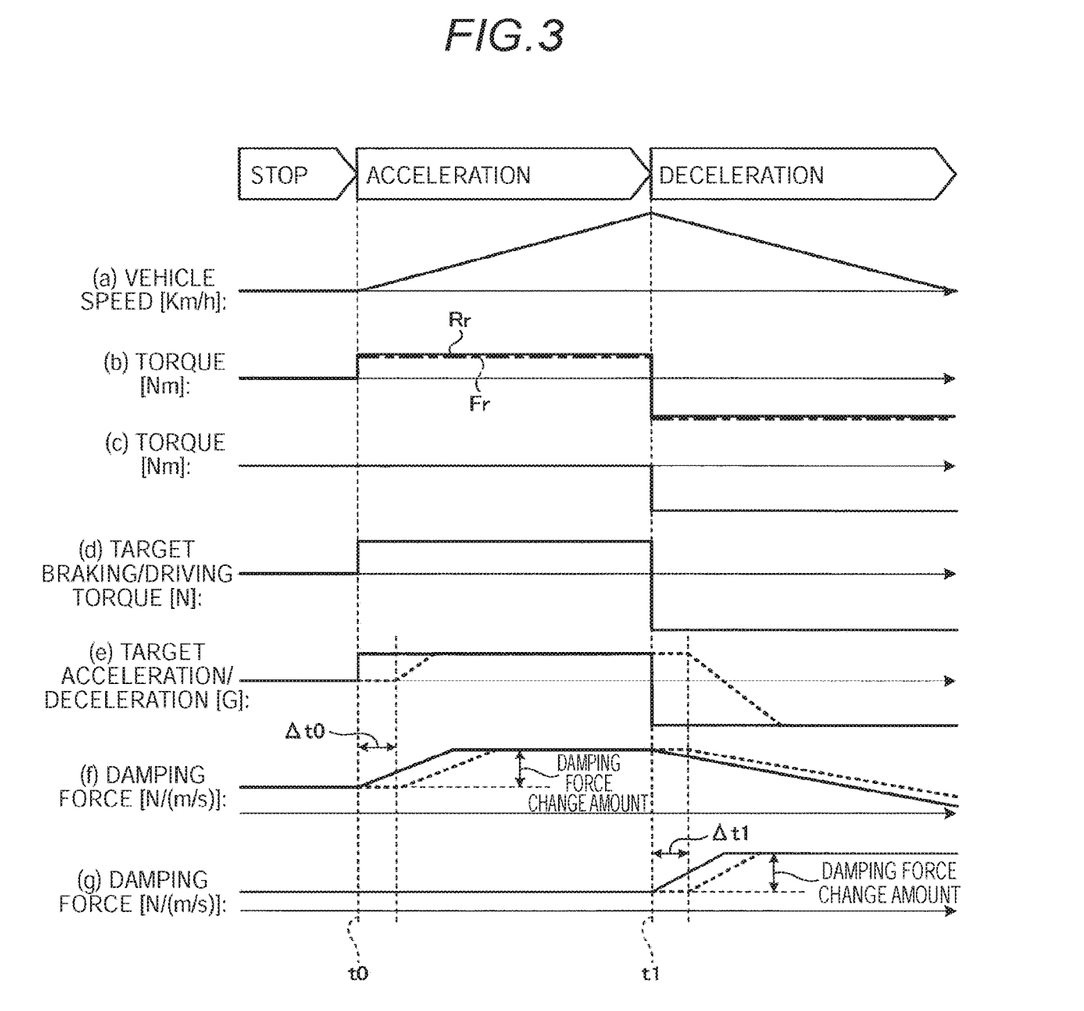
FIG. 3 is a diagram for explaining an example of a process of changing the damping force of the shock absorber in the vehicle according to the first embodiment.

Next, an example of a process of changing the damping force of the shock absorber 22 during acceleration or deceleration of the vehicle 1 according to the present embodiment will be described with reference to FIG. 3. FIG. 3 is a diagram for explaining an example of a process of changing the damping force of the shock absorber in the vehicle according to the first embodiment.

In FIG. 3(*a*) to (*g*), the horizontal axis represents time. In FIG. 3(*a*), the vertical axis represents the vehicle speed of the vehicle 1. In FIG. 3(*b*), the vertical axis represents the torque applied to the wheel of the vehicle 1 by the drive unit 20. In FIG. 3(*c*), the vertical axis represents the torque applied to the wheel of the vehicle 1 by the brake unit 21. In FIG. 3(*d*), the vertical axis represents the target braking/driving torque calculated by the target braking/driving force calculation portion 19*a*. In FIG. 3(*e*), the vertical axis represents the acceleration (broken line) detected by the longitudinal acceleration sensor 14 and the target acceleration/deceleration (solid line) acting on the vehicle 1. In FIG. 3(*f*), the vertical axis represents the damping force of the rear wheel shock absorber 22 of the vehicle 1. In FIG. 3(*g*), the vertical axis represents the damping force of the front wheel shock absorber 22 of the vehicle 1.

First, an example of a process of changing the damping force of the shock absorber 22 when the vehicle 1 accelerates will be described.

As illustrated in FIG. 3(*d*), the target braking/driving force calculation portion 19*a* calculates the target driving torque applied to the wheel of the vehicle 1 by the drive unit 20 as the target braking/driving torque based on the detection result of the position of the movable portion of the accelerating operation portion. Further, the target acceleration/deceleration calculation portion 19*b* calculates the target acceleration/deceleration acting on the vehicle 1 based on the target braking/driving torque.

The target braking/driving force distribution ratio calculation portion 19*c* calculates the target braking/driving force distribution ratio, which is a ratio of the target braking/driving torque distributed to the plurality of drive units 20, based on the target braking/driving torque and the target acceleration/deceleration.

The damping force change determination portion 19*d* calculates the damping force change amounts of the shock absorbers 22 of the front and rear wheels of the vehicle 1 based on the target acceleration/deceleration. For example, when accelerating the vehicle 1, the damping force change determination portion 19*d* increases the damping force change amount of the rear wheel shock absorber 22 of the vehicle 1 and sets the damping force change amount of the front wheel shock absorber 22 of the vehicle 1 to "0".

As illustrated in FIG. 3(*b*), the control command calculation portion 19*e* applies torques Fr and Rr (driving torque) to the front and rear wheels of the vehicle 1 by each of the plurality of drive units 20 based on the target braking/driving torque and the target braking/driving force distribution ratio from time t0. Accordingly, as illustrated in FIG. 3(*a*), the vehicle 1 starts accelerating from time t0 and gradually increases the vehicle speed.

As illustrated by the solid line in of FIG. 3(*f*), the control command calculation portion 19*e* starts increasing the damping force of the rear wheel shock absorber 22 of the vehicle 1 simultaneously with the start of acceleration of the vehicle 1 from time t0. Thereafter, as illustrated by the solid line in FIG. 3(*f*), the control command calculation portion 19*e* keeps increasing the damping force of the rear wheel shock absorber 22 of the vehicle 1 until the required damping force calculated by the damping force change determination portion 19*d* is reached. On the other hand, as illustrated by the solid line in FIG. 3(*g*), the control command calculation portion 19*e* does not change the damping force of the front wheel shock absorber 22 of the vehicle 1 even when the vehicle 1 starts accelerating from time t0.

When the vehicle 1 starts accelerating, the acceleration in the rear direction of the vehicle 1 is detected by the longitudinal acceleration sensor 14 as illustrated by the broken line in FIG. 3(*e*). Then, as illustrated by the broken line in FIG. 3(*f*), the control command calculation portion 19*e* can also start increasing the damping force of the rear wheel shock absorber 22 of the vehicle 1 based on the detection result of the acceleration in the rear direction of the vehicle 1 by the longitudinal acceleration sensor 14.

However, when the damping force of the shock absorber 22 is controlled based on the detection result of the acceleration in the rear direction of the vehicle 1 by the longitudinal acceleration sensor 14, it is necessary to wait for the detection of the acceleration in the rear direction of the vehicle 1 by the longitudinal acceleration sensor 14. As shown by the broken line in FIG. 3(*f*), the timing for starting the control of the damping force of the shock absorber 22 is delayed by the delay time Δt0. As a result, the suppression of the squat when the vehicle 1 accelerates is delayed, and the riding comfort when the vehicle 1 starts moving may be deteriorated.

On the other hand, in the present embodiment, as illustrated by the solid line in FIG. 3(*f*), the control command calculation portion 19*e* increases the damping force of the rear wheel shock absorber 22 of the vehicle 1 based on the damping force change amount calculated by the damping force change determination portion 19d without waiting for the detection of the acceleration in the rear direction of the vehicle 1 by the longitudinal acceleration sensor 14. Accordingly, it is possible to prevent the suppression of the squat when the vehicle 1 accelerates from being delayed, so that it is possible to improve the riding comfort when the vehicle 1 starts.

Next, an example of a process for changing the damping force of the shock absorber 22 when the vehicle 1 decelerates will be described.

As illustrated in FIG. 3(d), the target braking/driving force calculation portion 19a calculates the target braking torque applied to the wheels of the vehicle 1 by at least one of the drive unit 20 and the brake unit 21 as the target braking/driving torque based on the detection result of the position of the movable portion of the braking operation portion. Further, the target acceleration/deceleration calculation portion 19b calculates the target acceleration/deceleration acting on the vehicle 1 based on the target braking/driving torque.

The target braking/driving force distribution ratio calculation portion 19c calculates the target braking/driving force distribution ratio, which is a ratio of the target braking/driving torque distributed to at least one of the plurality of drive units 20 and the plurality of brake units 21, based on the target braking/driving torque and the target acceleration/deceleration.

The damping force change determination portion 19d calculates the damping force change amounts of the shock absorbers 22 of the front and rear wheels of the vehicle 1 based on the target acceleration/deceleration. For example, when decelerating the vehicle 1, the damping force change determination portion 19d increases the damping force change amount of the front wheel shock absorber 22 of the vehicle 1 and sets the damping force change amount of the rear wheel shock absorber 22 of the vehicle 1 to "0".

As illustrated in FIG. 3(b), the control command calculation portion 19e applies torques Fr and Rr (braking torque) to the front and rear wheels of the vehicle 1 by at least one of the plurality of drive units 20 and the plurality of brake units 21 based on the target braking/driving torque and the target braking/driving force distribution ratio from time t1. Accordingly, as illustrated in FIG. 3(a), the vehicle 1 starts decelerating from time 11 and gradually decreases the vehicle speed.

As illustrated by the solid line in FIG. 3(g), the control command calculation portion 19e starts increasing the damping force of the shock absorber 22 on the front wheel of the vehicle 1 simultaneously with the start of deceleration of the vehicle 1 from time t1. Thereafter, as illustrated by the solid line in FIG. 3(g), the control command calculation portion 19e keeps increasing the damping force of the front wheel shock absorber 22 of the vehicle 1 until the required damping force calculated by the damping force change determination portion 19d is reached. On the other hand, as illustrated by the solid line in FIG. 3(f), the control command calculation portion 19e continues to reduce the damping force of the rear wheel shock absorber 22 of the vehicle 1 when the vehicle 1 starts to decelerate at time t1.

When the vehicle 1 starts decelerating, the acceleration in the front direction of the vehicle 1 is detected by the longitudinal acceleration sensor 14 as illustrated by the broken line in FIG. 3(e). Then, as illustrated by the broken line in FIG. 3(g), the control command calculation portion 19e can also start increasing the damping force of the front wheel shock absorber 22 of the vehicle 1 based on the detection result of the acceleration in the front direction of the vehicle 1 by the longitudinal acceleration sensor 14.

However, when the damping force of the shock absorber 22 is controlled based on the detection result of the acceleration in the front direction of the vehicle 1 by the longitudinal acceleration sensor 14, it is necessary to wait for the detection of the acceleration in the front direction of the vehicle 1 by the longitudinal acceleration sensor 14 by the delay time Δt1. As shown by the broken line in FIG. 3(g), the timing for starting the control of the damping force of the shock absorber 22 is delayed by the delay time Δt1. As a result, the suppression of the nose dive when the vehicle 1 decelerates is delayed, and the riding comfort when the vehicle 1 decelerates may be deteriorated.

On the other hand, in the present embodiment, as illustrated by the solid line in FIG. 3(g), the control command calculation portion 19e increases the damping force of the front wheel shock absorber 22 of the vehicle 1 based on the damping force change amount calculated by the damping force change determination portion 19d without waiting for the detection of the acceleration in the front direction of the vehicle 1 by the longitudinal acceleration sensor 14. Accordingly, it is possible to prevent the suppression of the nose dive when the vehicle 1 decelerates from being delayed, so that it is possible to improve the riding comfort when the vehicle 1 decelerates.

As described above, with the vehicle 1 according to the first embodiment, before the acceleration is detected by the acceleration sensor due to acceleration, deceleration, or turning of the vehicle 1, the damping force of each shock absorber 22 can be changed, and the difference in the stroke amount of the plurality of shock absorbers 22 can be suppressed. As a result, the riding comfort of the vehicle 1 when the vehicle 1 accelerates, decelerates, or turns can be improved.

Second Embodiment

The present embodiment is an example in which at least one of the plurality of drive units and the plurality of brake units changes the torque applied to the wheel so that the difference in the stroke amount of the plurality of shock absorbers is reduced before the acceleration acting on the vehicle is detected by the acceleration sensor due to acceleration, deceleration, or turning of the vehicle. In the following description, the description of the same configuration as that of the first embodiment will be omitted.

In the present embodiment, when the vehicle 1 accelerates or decelerates, the target braking/driving force distribution ratio calculation portion 19c calculates the target braking/driving force distribution ratio so that the torque of at least one of the drive unit 20 and the brake unit 21 of the wheel existing on the acceleration direction side in the longitudinal direction of the vehicle 1 (hereinafter, referred to as acceleration direction-side torque) to be larger than the torque of at least one of the drive unit 20 and the brake unit 21 of the wheel existing on the non-acceleration direction side in the longitudinal direction of the vehicle 1 (hereinafter, referred to as non-acceleration direction-side torque).

In the present embodiment, when the vehicle 1 turns, the target braking/driving force distribution ratio calculation portion 19c calculates the target braking/driving force distribution ratio so that the non-acceleration direction-side torque of at least one of the drive unit 20 and the brake unit 21 of the wheel existing on the non-acceleration direction side in the vehicle width direction of the vehicle 1 to be larger than the acceleration direction side torque of at least one of the drive unit 20 and the brake unit 21 of the wheel existing on the acceleration direction side in the vehicle width direction.

In the present embodiment, the control command calculation portion 19e applies a torque to the wheel from at least one of the plurality of drive units 20 and the plurality of brake units 21 according to the target braking/driving force distribution ratio calculated by the target braking/driving force distribution ratio calculation portion 19c before the acceleration acting on the vehicle 1 is detected by the longitudinal acceleration sensor 14 due to acceleration or deceleration of the vehicle 1.

That is, when the vehicle 1 accelerates or decelerates, the control command calculation portion 19e makes the acceleration direction-side torque in the longitudinal direction of the vehicle 1 larger than the non-acceleration direction-side torque before the acceleration acting on the vehicle 1 is detected by the longitudinal acceleration sensor 14 due to acceleration or deceleration of the vehicle 1.

Accordingly, it is possible to increase the force for generating an upward acceleration with respect to the wheel existing on the acceleration direction side. As a result, squat and nose dive when the vehicle 1 accelerates or decelerates can be further suppressed, and the riding comfort of the vehicle 1 can be further improved.

In the present embodiment, when the vehicle 1 accelerates or decelerates, the control command calculation portion 19e makes the acceleration direction-side torque and the non-acceleration direction-side torque in the longitudinal direction of the vehicle 1 to be changed such that the acceleration direction-side torque and the non-acceleration direction-side torque are equal to each other when the damping force of the shock absorber 22 existing on the acceleration direction side has reached the required damping force (that is, when the damping force of the shock absorber 22 is increased by the damping force change amount).

After the damping force of the shock absorber 22 existing on the acceleration direction side reaches the required damping force, a margin can be given to the torque of the drive unit 20 or the brake unit 21. Therefore, the torque of the drive unit 20 or the brake unit 21 can be used for control other than the actual posture control of the vehicle 1 (for example, slip suppression control or vibration suppression control). Further, when the vehicle 1 operates continuously from acceleration to deceleration or from vehicle deceleration to acceleration, the amount of change in the torque of the drive unit 20 can be reduced, and the torque distribution ratio of the plurality of drive units 20 can be switched in a short time.

In the present embodiment, when the acceleration direction-side torque in the longitudinal direction of the vehicle 1 is made larger than the non-acceleration direction-side torque, the control command calculation portion 19e makes the change amount of the damping force per unit time of the shock absorber 22 existing in the acceleration direction smaller than the upper limit of the change amount of the damping force per unit time of the damping force of the shock absorber 22 when the acceleration direction-side torque in the longitudinal direction of the vehicle 1 is made equal to the non-acceleration direction-side torque. Accordingly, it is possible to prevent the damping force of the shock absorber 22 existing on the acceleration direction side from suddenly increasing and prevent the occupant of the vehicle 1 from feeling uncomfortable.

In the present embodiment, when the vehicle 1 turns, the control command calculation portion 19e applies torque to the wheel from at least one of the plurality of drive units 20 and the plurality of brake units 21 according to the target braking/driving force distribution ratio calculated by the target braking/driving force distribution ratio calculation portion 19c before the acceleration acting on the vehicle 1 is detected by the lateral acceleration sensor 15 due to turning of the vehicle 1.

That is, when the vehicle 1 turns, the control command calculation portion 19e makes the non-acceleration direction-side torque in the vehicle width direction larger than the acceleration direction-side torque in the vehicle width direction before the acceleration acting on the vehicle 1 is detected by the lateral acceleration sensor 15 due to turning of the vehicle 1.

Accordingly, when the vehicle 1 turns, it is possible to increase the force for generating an upward acceleration with respect to the wheel existing on the non-acceleration direction side in the vehicle width direction. As a result, the inclination of the vehicle 1 when the vehicle 1 turns can be further suppressed, and the riding comfort of the vehicle 1 can be further improved.

Therefore, in the present embodiment, the target braking/driving force distribution ratio calculation portion 19c, the damping force change determination portion 19d, and the control command calculation portion 19e function as an example of a control portion.

Figure 4:
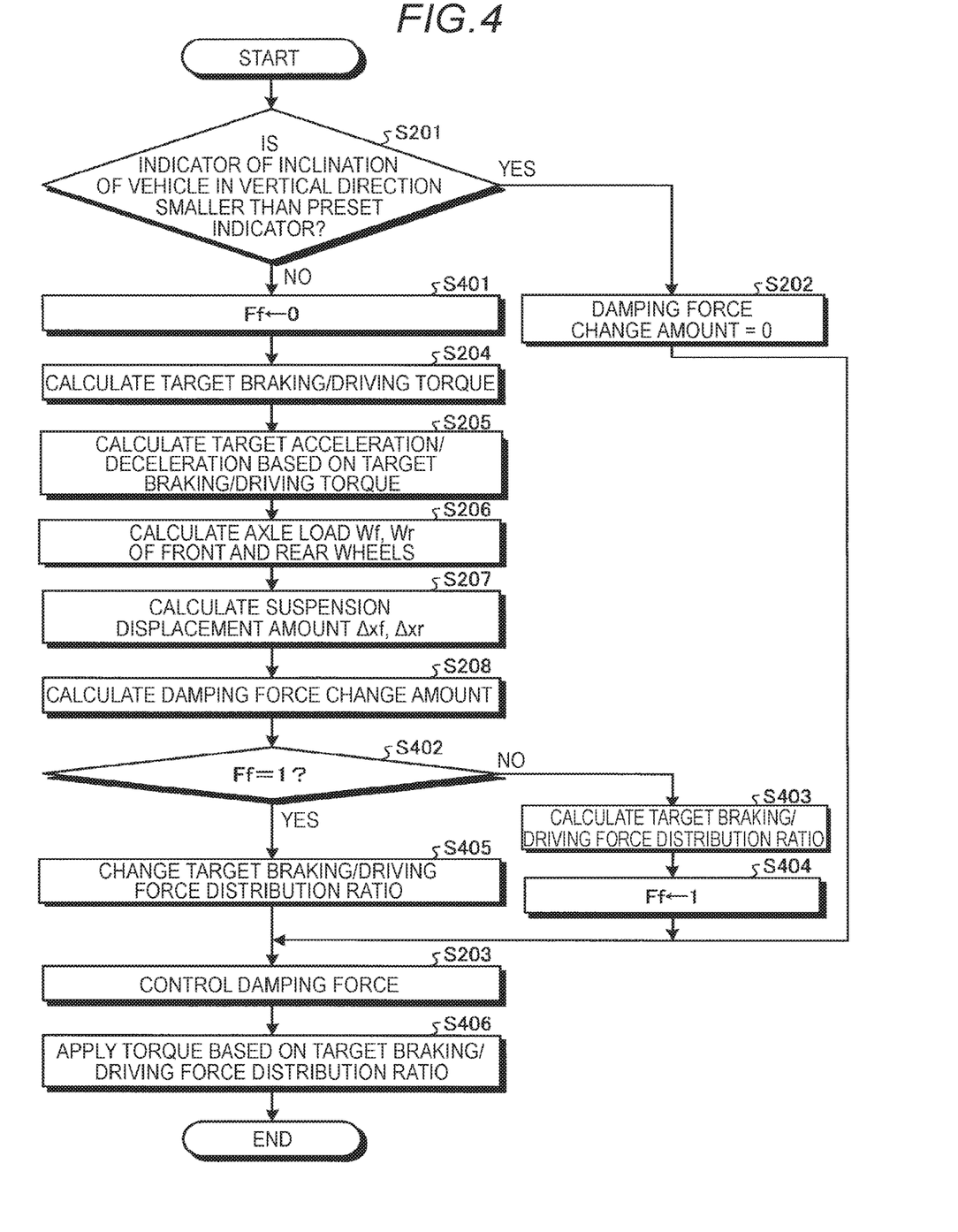
FIG. 4 is a flowchart illustrating an example of a flow of a control process of a torque of at least one of a drive unit and a brake unit in a vehicle according to a second embodiment.

Next, with reference to FIG. 4, an example of a flow of a control process of the torque of at least one of the drive unit 20 and the brake unit 21 during acceleration or deceleration of the vehicle 1 according to the present embodiment will be described. FIG. 4 is a flowchart illustrating an example of a flow of a control process of the torque of at least one of the drive unit and the brake unit in a vehicle according to a second embodiment. The process illustrated in steps S201 to S208 in FIG. 4 is the same as the process illustrated in FIG. 2 described above, and a description thereof will be omitted.

When it is determined that the indicator of the inclination of the vehicle 1 in the vertical direction is equal to or larger than the preset indicator (step S201: No), the target braking/driving force distribution ratio calculation portion 19c sets a distribution ratio determination completion flag Ff to "0" (step S401). Here, the distribution ratio determination completion flag Ff indicates "1" when the calculation of the target braking/driving force distribution ratio has been completed, and indicates "0" when the calculation of the target braking/driving force distribution ratio has not been completed.

After that, when the damping force change amount is calculated in step S208, the target braking/driving force distribution ratio calculation portion 19c determines whether or not the distribution ratio determination completion flag Ff is "1" (step S402). When the distribution ratio determination completion flag Ff is "0" (step S402: No), the target braking/driving force distribution ratio calculation portion 19c calculates the target braking/driving force distribution ratio in which the acceleration direction-side torque in the longitudinal direction of the vehicle 1 is larger than the non-acceleration direction-side torque (step S403). Then, the target braking/driving force distribution ratio calculation portion 19c updates the distribution ratio determination completion flag Ff to "1" (step S404).

On the other hand, when the distribution ratio determination completion flag Ff is "1" (step S402: Yes), the target braking/driving force distribution ratio calculation portion 19c gradually changes the target braking/driving force distribution ratio such that the target braking/driving torques of at least one of the plurality of drive units 20 and the plurality of brake units 21 are equal based on the difference between the required damping force and the current damping force of the shock absorber 22 (step S405).

Next, the control command calculation portion 19e applies a torque to the wheel from at least one of the plurality of drive units 20 and the plurality of brake units 21 based on the target braking/driving force distribution ratio calculated by the target braking/driving force distribution ratio calculation portion 19c in step S403 or the target braking/driving force distribution ratio changed by the target braking/driving force distribution ratio calculation portion 19c in step S405 (step S406). When the damping force of the shock absorber 22 on the rear wheel of the vehicle 1 approaches the required damping force, or when the damping force of the shock absorber 22 on the front wheel of the vehicle 1 approaches the required damping force, the process from S402 is repeatedly executed.

Figure 5:
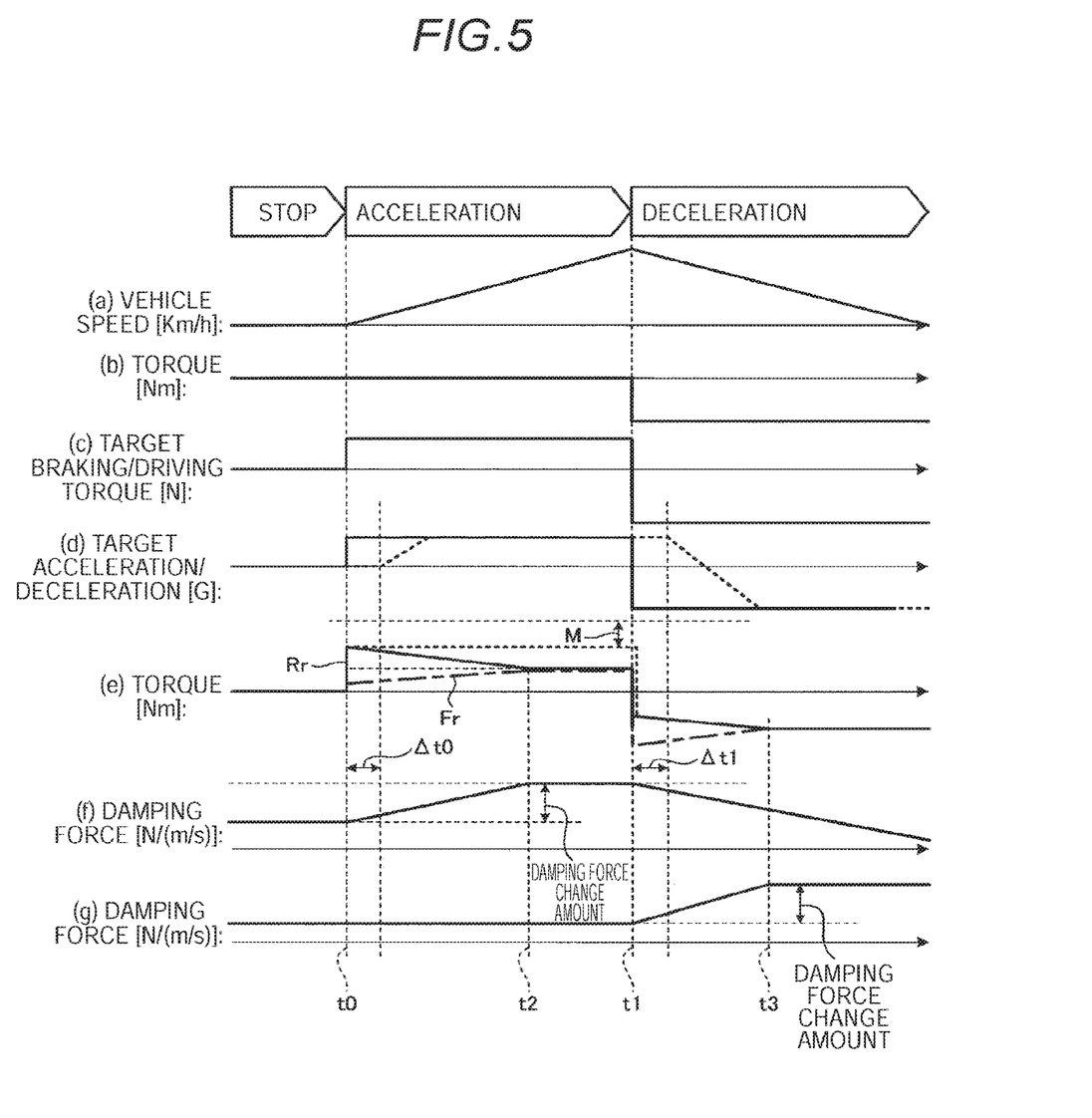
FIG. 5 is a diagram for explaining an example of a control process of a torque of the drive unit in the vehicle according to the second embodiment.
Figure 6:
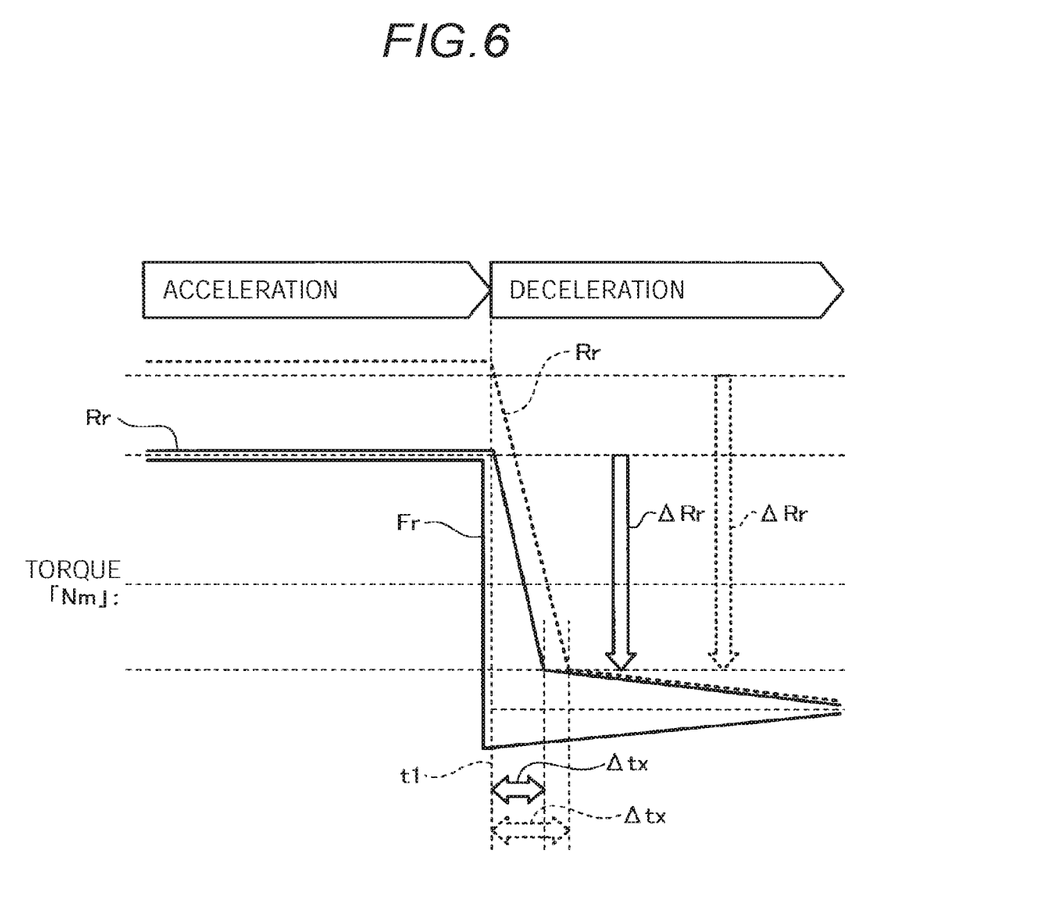
FIG. 6 is a diagram for explaining an example of a control process of the torque of the drive unit in the vehicle according to the second embodiment.

Next, an example of the control process of the torque of the drive unit 20 during acceleration or deceleration of the vehicle 1 according to the present embodiment will be described with reference to FIGS. 5 and 6. FIGS. 5 and 6 are diagrams for explaining an example of a control process of the torque of the drive unit in the vehicle according to the second embodiment. In the following description, the description of the same process as the process illustrated in FIG. 3 will be omitted.

In FIG. 5(a) to (g) and FIG. 6, the horizontal axis represents time. In FIG. 5(a), the vertical axis represents the vehicle speed of the vehicle 1. In FIG. 5(b), the vertical axis represents the torque applied to the wheels of the vehicle 1 by the brake unit 21. In FIG. 5(c), the vertical axis represents the target braking/driving torque calculated by the target braking/driving force calculation portion 19a. In FIG. 5(d), the vertical axis represents the acceleration (broken line) detected by the longitudinal acceleration sensor 14 and the target acceleration/deceleration (solid line) acting on the vehicle 1. In FIG. 5(e) and FIG. 6, the vertical axis represents the torque that the drive unit 20 applies to the wheels of the vehicle 1. In FIG. 5(f), the vertical axis represents the damping force of the rear wheel shock absorber 22 of the vehicle 1. In FIG. 5(g), the vertical axis represents the damping force of the front wheel shock absorber 22 of the vehicle 1.

First, an example of a control process of the driving force of the drive unit 20 when the vehicle 1 accelerates will be described.

The target braking/driving force distribution ratio calculation portion 19c calculates the target braking/driving force distribution ratio based on the target braking/driving torque calculated by the target braking/driving force calculation portion 19a and the target acceleration/deceleration calculated by the target acceleration/deceleration calculation portion 19b. At this time, the target braking/driving force distribution ratio calculation portion 19c calculates the target braking/driving force distribution ratio such that the driving torque of the drive unit 20 for the rear wheel of the vehicle 1 becomes larger than the driving torque of the drive unit 20 for the front wheel of the vehicle 1.

As illustrated in FIG. 5(e), the control command calculation portion 19e applies torques Fr and Rr (driving torque) to the front and rear wheels of the vehicle 1 by each of the plurality of drive units 20 based on the target braking/driving torque and the target braking/driving force distribution ratio from time t0. Accordingly, when the vehicle 1 accelerates, the control command calculation portion 19e makes the torque of the drive unit 20 for the rear wheel of the vehicle 1 larger than as the torque of the drive unit 20 of the front wheel of the vehicle 1 illustrated in FIG. 5(e).

When the damping force of the rear wheel shock absorber 22 of the vehicle 1 approaches the required damping force (time t2), the target braking/driving force distribution ratio calculation portion 19c gradually changes the target braking/driving force distribution ratio so that the torque of the drive unit 20 for the rear wheel of the vehicle 1 is equal to the torque of the drive unit 20 for the front wheel of the vehicle 1. Then, when the damping force of the rear wheel shock absorber 22 of the vehicle 1 reaches the required damping force (time t2), it is become the target braking/driving force distribution ratio that the torque of the drive device 20 for the rear wheel of the vehicle 1 and the torque of the drive device 20 for the front wheel of the vehicle 1 is equal. Then, the control command calculation portion 19e gradually changes the torques Fr and Rr based on the target braking/driving force distribution ratio changed by the target braking/driving force distribution ratio calculation portion 19c.

After the damping force of the rear wheel shock absorber 22 of the vehicle 1 reaches the required damping force, the margin M of the torque of each drive unit 20 can be increased so that the torque of each drive unit 20 can be used for control other than the actual posture control of the vehicle 1 (for example, slip suppression control or vibration suppression control).

Next, an example of a control process of the driving force of the drive unit 20 when the vehicle 1 decelerates will be described.

The target braking/driving force distribution ratio calculation portion 19c calculates the target braking/driving force distribution ratio based on the target braking/driving torque calculated by the target braking/driving force calculation portion 19a and the target acceleration/deceleration calculated by the target acceleration/deceleration calculation portion 19b. At this time, the target braking/driving force distribution ratio calculation portion 19c calculates the target braking/driving force distribution ratio such that the braking torque of the drive unit 20 for the front wheel of the vehicle 1 becomes larger than the braking torque of the drive unit 20 for the rear wheel of the vehicle 1.

As illustrated in FIG. 5(e), the control command calculation portion 19e applies torques Fr and Rr (braking torque) to the front and rear wheels of the vehicle 1 by each of the plurality of drive units 20 based on the target braking/driving torque and the target braking/driving force distribution ratio from time 11. Accordingly, when the vehicle 1 decelerates, the control command calculation portion 19e makes the torque of the drive unit 20 for the front wheel of the vehicle 1 larger than as the torque of the drive unit 20 of the rear wheel of the vehicle 1 illustrated in FIG. 5(e).

When the damping force of the front wheel shock absorber 22 of the vehicle 1 approaches the required damping force (time t3), the target braking/driving force distribution ratio calculation portion 19c gradually changes the target braking/driving force distribution ratio so that the torque of the drive unit 20 for the front wheel of the vehicle 1 is equal to the torque of the drive unit 20 for the rear wheel of the vehicle 1. Then, when the damping force of the front wheel shock absorber 22 of the vehicle 1 reaches the required damping force (time t3), it is become the target braking/driving force distribution ratio that the torque of the drive device 20 for the front wheel of the vehicle 1 and the torque of the drive device 20 for the rear wheel of the vehicle 1 is equal. Then, the control command calculation portion 19e gradually changes the torques Fr and Rr based on the target braking/driving force distribution ratio changed by the target braking/driving force distribution ratio calculation portion 19c.

After the damping force of the front wheel shock absorber 22 of the vehicle 1 reaches the required damping force, the margin M of the torque of each drive unit 20 can be increased so that the torque of each drive unit 20 can be used for control other than the control of the posture of the vehicle 1 (for example, slip suppression control or vibration suppression control).

As illustrated in FIG. 6, at the time t1, the distribution ratios of the torques Fr and Rr of the plurality of drive units 20 are equal. Therefore, as illustrated in FIG. 6, when the operation of the vehicle 1 continuously changes from acceleration to deceleration, compared with the change amount ΔRr of the torque Rr when the torque Rr (broken line) is not equal to the torque Fr, the change amount ΔRr of the torque Rr when the torque Fr (solid line) and the torque Rr are equal can be reduced. As a result, as illustrated in FIG. 6, the time Δtx required to switch the distribution ratios of the torques Fr and Rr of the plurality of drive units 20 can be reduced.

As described above, according to the vehicle 1 of the second embodiment, it is possible to increase the force for generating an upward acceleration with respect to the wheel existing on the acceleration direction side. As a result, squat and nose dive when the vehicle 1 accelerates or decelerates can be further suppressed, and the riding comfort of the vehicle 1 can be further improved.

Third Embodiment

The present embodiment is an example in which, when the vehicle is decelerated, before the deceleration of the vehicle is started, the damping force of a shock absorber existing on the acceleration direction side in the longitudinal direction of the vehicle is made larger than the damping force of the shock absorber existing on the non-acceleration direction side in the longitudinal direction of the vehicle. In the following description, the description of the same configuration as that of the first and second embodiments will be omitted.

In the present embodiment, when the vehicle 1 is decelerated, the control command calculation portion 19e makes the damping force of the front wheel shock absorber 22 of the vehicle 1 larger than the damping force of the rear wheel shock absorber 22 of the vehicle 1 before the deceleration of the vehicle 1 is started (in other words, before the braking torque is applied to the wheel of the vehicle 1 by at least one of the drive unit 20 and the brake unit 21).

Accordingly, when the deceleration of the vehicle 1 is started, the damping force of the front wheel shock absorber 22 of the vehicle 1 can be made closer to the required damping force. As a result, nose dive due to deceleration of the vehicle 1 can be more effectively suppressed, and the riding comfort of the vehicle 1 can be further improved.

However, when the driver of the vehicle 1 suddenly brakes, the control command calculation portion 19e does not wait for the damping force of the front wheel shock absorber 22 of the vehicle 1 to reach the required damping force and applies the braking torque to the wheel of the vehicle 1 by the drive unit 20 and the brake unit 21.

Figure 7:
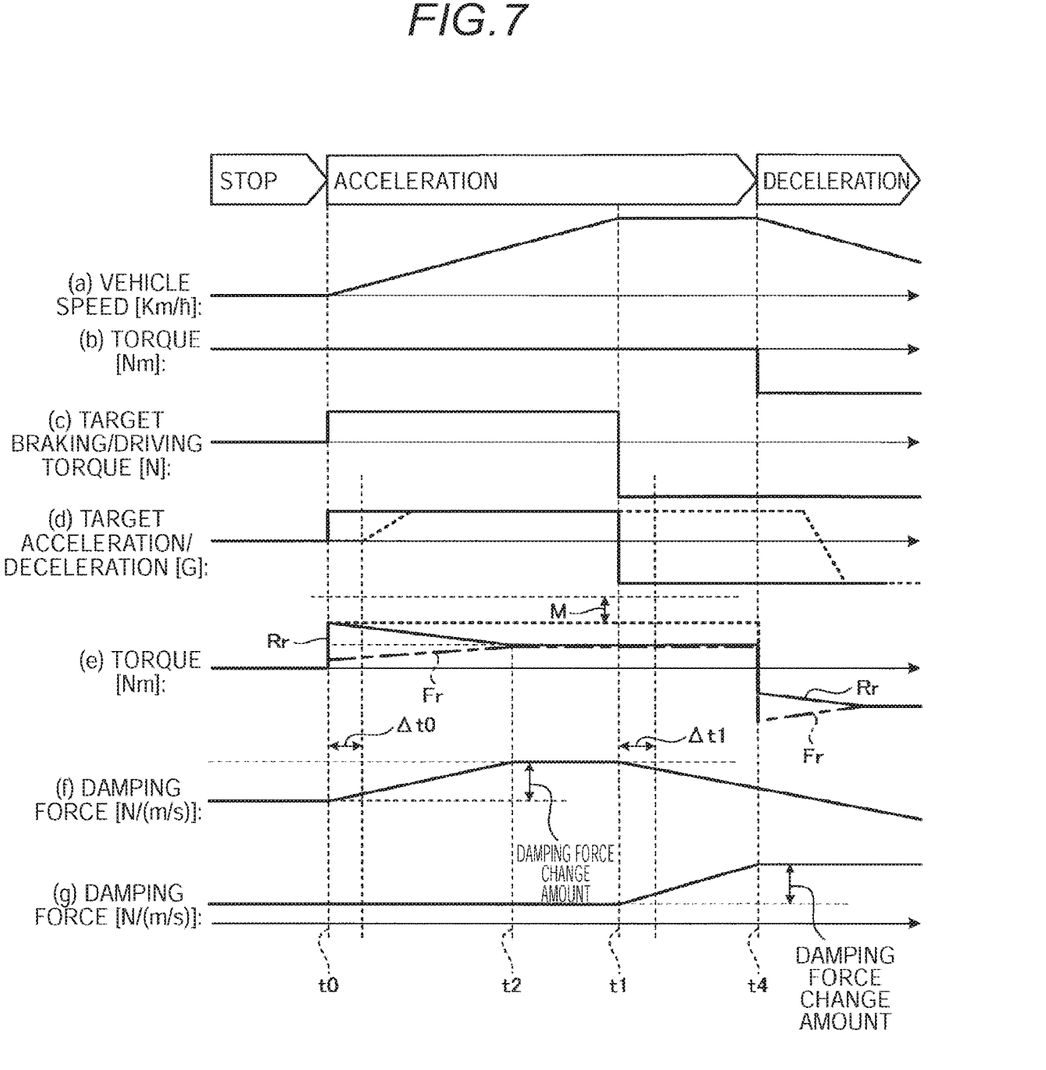
FIG. 7 is a diagram for explaining an example of a process of changing a damping force of a shock absorber in a vehicle according to a third embodiment.

Next, an example of a process of changing the damping force of the shock absorber 22 in the vehicle 1 according to the present embodiment will be described with reference to FIG. 7. FIG. 7 is a diagram for explaining an example of a process of changing a damping force of a shock absorber in a vehicle according to the third embodiment. In the following description, the description of the same process as the process illustrated in FIG. 5 will be omitted.

In FIG. 7(a) to (g), the horizontal axis represents time. In FIG. 7(a), the vertical axis represents the vehicle speed of the vehicle 1. In FIG. 7(b), the vertical axis represents the torque applied to the wheel of the vehicle 1 by the brake unit 21. In FIG. 7(c), the vertical axis represents the target braking/driving torque calculated by the target braking/driving force calculation portion 19a. In FIG. 7(d), the vertical axis represents the acceleration (broken line) detected by the longitudinal acceleration sensor 14 and the target acceleration/deceleration (solid line) acting on the vehicle 1. In FIG. 7(e), the vertical axis represents the torque applied to the wheel of the vehicle 1 by the drive unit 20. In FIG. 7(f), the vertical axis represents the damping force of the rear wheel shock absorber 22 of the vehicle 1. In FIG. 7(g), the vertical axis represents the damping force of the front wheel shock absorber 22 of the vehicle 1.

As illustrated in FIG. 7(g), before the torques Fr and Rr (braking torque) are applied to the front and rear wheels of the vehicle 1 by the drive unit 20 and the brake unit 21 based on the target braking/driving torque and the target braking/driving force distribution ratio from time t1, the control command calculation portion 19e increases the damping force of the front wheel shock absorber 22 of the vehicle 1 based on the damping force change amount calculated by the damping force change determination portion 19d from the time t4.

Accordingly, when the deceleration of the vehicle 1 is started at time t4, the damping force of the front wheel shock absorber 22 of the vehicle 1 can be made closer to the required damping force. As a result, nose dive due to deceleration of the vehicle 1 can be more effectively suppressed, and the riding comfort of the vehicle 1 can be further improved.

As described above, according to the vehicle 1 of the third embodiment, when the deceleration of the vehicle 1 is started, the damping force of the front wheel shock absorber 22 of the vehicle 1 can be made closer to the required damping force. As a result, nose dive due to deceleration of the vehicle 1 can be more effectively suppressed, and the riding comfort of the vehicle 1 can be further improved.

Fourth Embodiment

The present embodiment is an example of executing control for not generating the driving torque from the drive unit or executing control for generating the braking torque from brake unit until the damping force of the rear wheel shock absorber of the vehicle reaches the required damping force when the vehicle starts. In the following description, the description of the same configuration as that of the first to third embodiments will be omitted.

In the present embodiment, when the vehicle 1 starts, the control command calculation portion 19e can also prevent the vehicle 1 from starting by executing control for not generating the driving torque from the drive unit 20 (for example, no current is supplied to the drive unit 20) or executing control for generating the braking torque from brake unit 21 until the damping force of the rear wheel shock absorber 22 of the vehicle 1 reaches the required damping force. Thus, when the vehicle 1 starts, squat due to acceleration of the vehicle 1 can be more effectively suppressed, and the riding comfort of the vehicle 1 can be further improved.

Figure 8:
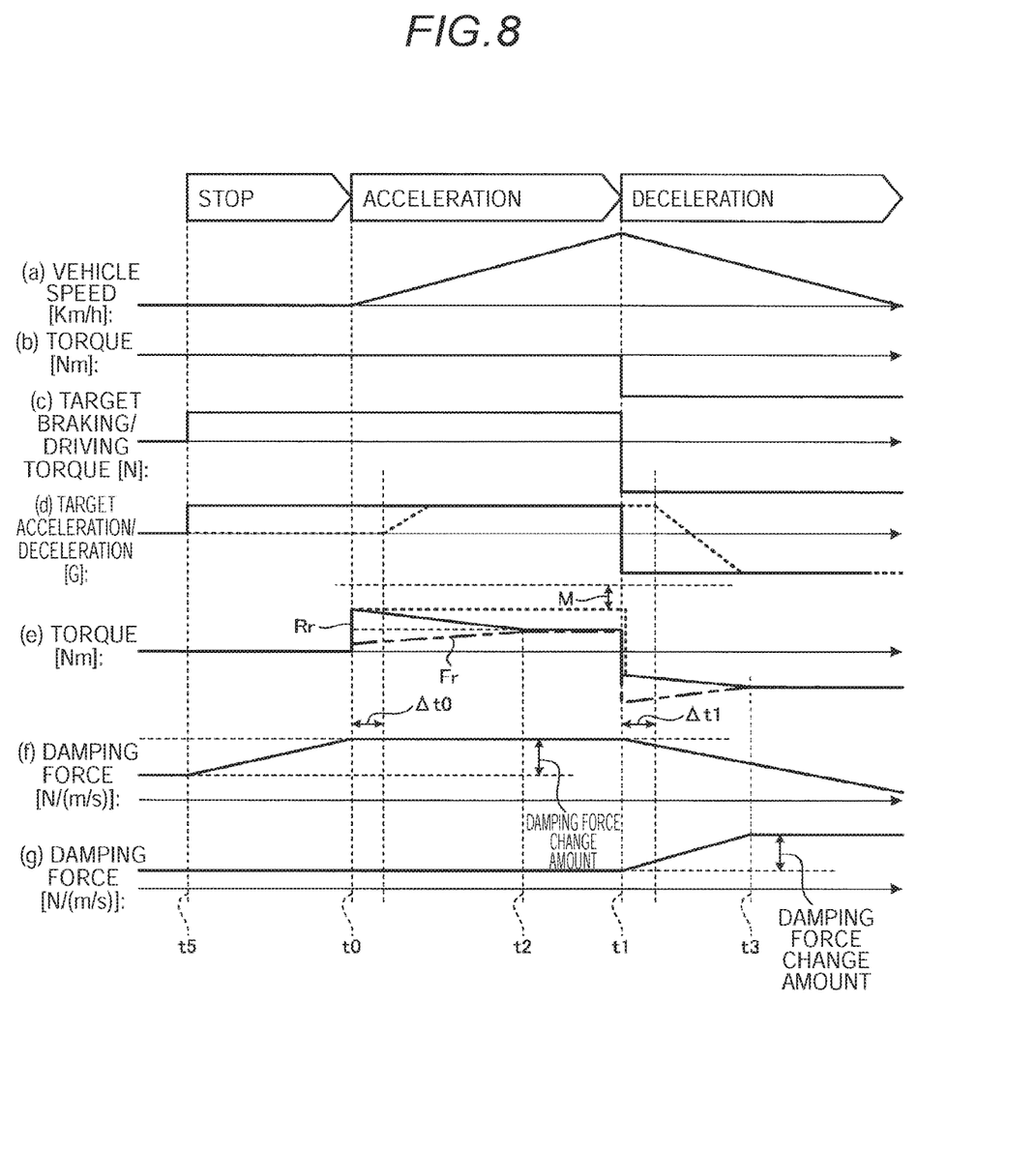
FIG. 8 is a diagram for explaining an example of a control process of a torque of a drive unit in a vehicle according to a fourth embodiment.

Next, an example of the control process of the torque of the drive unit 20 at the time of starting in the vehicle 1 according to the present embodiment will be described with reference to FIG. 8. FIG. 8 is a diagram for explaining an example of a control process of a torque of a drive unit in a vehicle according to a fourth embodiment. In the following description, the description of the same process as the process illustrated in FIG. 5 will be omitted.

In FIG. 8(a) to (g), the horizontal axis represents time. In FIG. 8(a), the vertical axis represents the vehicle speed of the vehicle 1. In FIG. 8(b), the vertical axis represents the torque applied to the wheel of the vehicle 1 by the brake unit 21. In FIG. 8(c), the vertical axis represents the target braking/driving torque calculated by the target braking/driving force calculation portion 19a. In FIG. 8(d), the vertical axis represents the acceleration (broken line) detected by the longitudinal acceleration sensor 14 and the target acceleration/deceleration (solid line) acting on the vehicle 1. In FIG. 8(e), the vertical axis represents the torque applied to the wheel of the vehicle 1 by the drive unit 20. In FIG. 8(f), the vertical axis represents the damping force of the rear wheel shock absorber 22 of the vehicle 1. In FIG. 8(g), the vertical axis represents the damping force of the front wheel shock absorber 22 of the vehicle 1.

In the present embodiment, as illustrated in FIG. 8(f), at time t0, the control command calculation portion 19e increases the damping force of the rear wheel shock absorber 22 of the vehicle 1 based on the damping force change amount calculated by the damping force change determination portion 19d from time t5 before the torques Fr and Rr are applied to the front and rear wheels of the vehicle 1.

In other words, as illustrated in FIG. 8(f), when the vehicle 1 starts moving, the control command calculation portion 19e increases the damping force of the rear wheel shock absorber 22 of the vehicle 1 from time t5, and does not increase the torques Fr and Rr (driving torque) from the drive unit 20 until the damping force of the rear wheel shock absorber 22 reaches the required damping force. Then, at time t0, when the damping force of the rear wheel shock absorber 22 of the vehicle 1 reaches the required damping force, the control command calculation portion 19e increases the torques Fr and Rr from the drive unit 20.

Accordingly, when the acceleration of the vehicle 1 is started at time t0, the damping force of the rear wheel shock absorber 22 of the vehicle 1 can be made closer to the required damping force. As a result, squat due to acceleration of the vehicle 1 can be more effectively suppressed, and the riding comfort of the vehicle 1 can be further improved.

As described above, according to the vehicle 1 of the fourth embodiment, when the acceleration of the vehicle 1 is started, the damping force of the rear wheel shock absorber 22 of the vehicle 1 can be made closer to the required damping force. As a result, squat due to acceleration of the vehicle 1 can be more effectively suppressed, and the riding comfort of the vehicle 1 can be further improved.

As described above, with the vehicle 1 according to the first to fourth embodiments, the riding comfort of the vehicle 1 when the vehicle 1 accelerates, decelerates, or turns can be improved.

A vehicle control device according to an aspect of this disclosure includes, for example, a control portion that makes, of a plurality of shock absorbers included in a vehicle, a first damping force of at least one shock absorber that is located on a first direction side on which acceleration acts in a longitudinal direction of the vehicle larger than a second damping force of at least one shock absorber of the plurality of shock absorbers that is located on a second direction side opposite to the first direction in the longitudinal direction of the vehicle before acceleration acting on the vehicle is detected by an acceleration sensor due to acceleration or deceleration of the vehicle. Therefore, as an example, the riding comfort of the vehicle when the vehicle accelerates or decelerates can be improved.

Further, as an example, in the vehicle control device according to the aspect of this disclosure, the vehicle may have, for each wheel of the vehicle, a motor and a brake unit that apply a torque to the wheel, and the control portion may further make a first torque of at least one of the motor and the brake unit of the wheel located on the first direction side in the longitudinal direction larger than a second torque of at least one of the motor and the brake unit of the wheel existing on the second direction side in the longitudinal direction before acceleration acting on the vehicle is detected by the acceleration sensor due to acceleration or deceleration of the vehicle. Therefore, as an example, the riding comfort of the vehicle when the vehicle accelerates or decelerates can be further improved.

In the vehicle control device according to the aspect of this disclosure, as an example, the control portion may make the first torque and the second torque to be changed such that the first torque and the second torque are equal to each other when the first damping force reaches a preset required damping force. Therefore, as an example, the torque of the motor or the brake unit can be used for control other than the control of the posture of the vehicle.

In the vehicle control device according to the aspect of this disclosure, as an example, the control portion may make the first torque larger than the second torque and further make a change amount of the first damping force per unit time smaller than an upper limit of a change amount of the first damping force per unit time when the first torque is made equal to the second torque. Therefore, as an example, it is possible to prevent the damping force of the shock absorber existing on the acceleration direction side from suddenly increasing and prevent the occupant of the vehicle from feeling uncomfortable.

In the vehicle control device according to the aspect of this disclosure, as an example, when decelerating the vehicle, the control portion may make the first damping force larger than the second damping force before the deceleration of the vehicle is started. Therefore, as an example, nose dive due to deceleration of the vehicle can be more effectively suppressed, and the riding comfort of the vehicle can be further improved.

In the vehicle control device according to the aspect of this disclosure, as an example, the control portion may calculate an axle load of each of the front and rear wheels of the vehicle based on a target acceleration/deceleration of the vehicle, calculate suspension displacement amounts of at least one shock absorbers located on the first direction side and the second direction side, respectively, based on the calculated axle load, calculate change amounts of the damping forces of the at least one shock absorbers such that a difference in stroke amounts of the at least one shock absorbers is reduced based on the calculated suspension displacement amounts, and increase the damping forces of the at least one shock absorbers by the calculated change amounts of the damping forces. Therefore, as an example, the riding comfort of the vehicle when the vehicle accelerates or decelerates can be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control device comprising:
 a control portion that
  obtains detection results of operations of a driver,
  calculates an indicator of an inclination of the vehicle in a vertical direction and a target braking/driving torque based on the detection results, before acceleration acting on the vehicle is detected by an acceleration sensor due to acceleration or deceleration of the vehicle, and
  when the indicator of the inclination of the vehicle in the vertical direction is equal to or larger than a preset indicator, makes based on the target braking/driving torque, of a plurality of shock absorbers included in a vehicle, a first damping force of at least one shock absorber that is located on a first direction side on which acceleration acts in a longitudinal direction of the vehicle larger than a second damping force of at least one shock absorber of the plurality of shock absorbers that is located on a second direction side opposite to the first direction in the longitudinal direction of the vehicle.

2. The vehicle control device according to claim 1, wherein
 the vehicle has, for each wheel of the vehicle, a motor and a brake unit that apply a torque to the wheel, and
 the control portion further makes a first torque of at least one of the motor and the brake unit of the wheel located on the first direction side in the longitudinal direction larger than a second torque of at least one of the motor and the brake unit of the wheel existing on the second direction side in the longitudinal direction before acceleration acting on the vehicle is detected by the acceleration sensor due to acceleration or deceleration of the vehicle.

3. The vehicle control device according to claim 2, wherein
 the control portion makes the first torque and the second torque to be changed such that the first torque and the second torque are equal to each other when the first damping force reaches a preset required damping force.

4. The vehicle control device according to claim 2, wherein
 the control portion makes the first torque larger than the second torque and further makes a change amount of the first damping force per unit time smaller than an upper limit of a change amount of the first damping force per unit time when the first torque is made equal to the second torque.

5. The vehicle control device according to claim 1, wherein
 when decelerating the vehicle, the control portion makes the first damping force larger than the second damping force before the deceleration of the vehicle is started.

6. The vehicle control device according to claim 1, wherein
 the control portion calculates an axle load of each of the front and rear wheels of the vehicle based on a target acceleration/deceleration of the vehicle, calculates suspension displacement amounts of at least one shock absorbers located on the first direction side and the second direction side, respectively, based on the calculated axle load, calculates change amounts of the damping forces of the at least one shock absorbers such that a difference in stroke amounts of the at least one shock absorbers is reduced based on the calculated suspension displacement amounts, and increases the damping forces of the at least one shock absorbers by the calculated change amounts of the damping forces.

7. The vehicle control device according to claim 1, wherein
 the operations of the driver include at least one of an accelerating operation, a braking operation, a gear shift operation, a steering operation.

* * * * *